United States Patent
Jerabek et al.

(10) Patent No.: US 10,392,498 B2
(45) Date of Patent: Aug. 27, 2019

(54) FIBER REINFORCED POLYPROPYLENE COMPOSITION WITH HIGH STRAIN AT BREAK

(71) Applicant: Borealis AG, Vienna (AT)

(72) Inventors: Michael Jerabek, Leonding (AT); Wolfgang Stockreiter, Puchenau (AT)

(73) Assignee: Borealis AG, Vienna (AT)

( * ) Notice: Subject to any disclaimer, the term of this patent is extended or adjusted under 35 U.S.C. 154(b) by 64 days.

(21) Appl. No.: 15/736,528

(22) PCT Filed: Jun. 27, 2016

(86) PCT No.: PCT/EP2016/064776
§ 371 (c)(1),
(2) Date: Dec. 14, 2017

(87) PCT Pub. No.: WO2017/001309
PCT Pub. Date: Jan. 5, 2017

(65) Prior Publication Data
US 2018/0201763 A1  Jul. 19, 2018

(30) Foreign Application Priority Data
Jul. 1, 2015  (EP) .................................... 15174807

(51) Int. Cl.
| | |
|---|---|
| *C08K 7/14* | (2006.01) |
| *C08L 23/14* | (2006.01) |
| *C08L 23/12* | (2006.01) |
| *C08L 51/06* | (2006.01) |

(52) U.S. Cl.
CPC ............... *C08K 7/14* (2013.01); *C08L 23/12* (2013.01); *C08L 23/14* (2013.01); *C08L 23/142* (2013.01); *C08L 51/06* (2013.01); C08L 2203/14 (2013.01); C08L 2205/03 (2013.01); C08L 2205/16 (2013.01); C08L 2207/02 (2013.01)

(58) Field of Classification Search
None
See application file for complete search history.

(56) References Cited

U.S. PATENT DOCUMENTS

| | | | |
|---|---|---|---|
| 2010/0317791 A1* | 12/2010 | Stockreiter | ............. C08L 23/10 524/528 |
| 2014/0288225 A1 | 9/2014 | Shipley et al. | |

FOREIGN PATENT DOCUMENTS

| | | |
|---|---|---|
| EP | 572028 | 5/1993 |
| EP | 0887379 | 12/2004 |
| EP | 2062936 | 5/2009 |
| EP | 2308923 | 4/2011 |
| EP | 1357144 | 10/2013 |
| EP | 2754691 | 7/2014 |
| EP | 2821434 | 1/2015 |
| WO | WO1992012182 | 7/1992 |
| WO | WO1998016359 | 10/1997 |
| WO | WO1999024478 | 11/1998 |
| WO | WO1999024479 | 5/1999 |
| WO | WO2000068315 | 5/2000 |
| WO | WO2004000899 | 12/2003 |
| WO | WO2004111095 | 12/2004 |
| WO | WO2009/065589 | 5/2009 |
| WO | 2011042364 | 4/2011 |
| WO | WO2013149915 | 10/2013 |
| WO | WO2014033017 | 3/2014 |

OTHER PUBLICATIONS

Fujiyama Mitsuyoshi and Kimura Shukichi, "Effect of Molecular Parameters on the Shrinkage of Injection-Molded Polypropylene", Journal of Applied Polymer Science, vol. 22, 1225-1242, 1978.
International Search Report and Written Opinion for PCT/EP2016/064776 dated Jul. 28, 2016, 12 pages.
Ivanyukov D.V. et al., "Polypropylene (Properties and use)", English translation, p. 123 to 124, 145 to 148, 1974, 11 pages.
English translation of Office Action for Russian Patent Application No. 2018102559/04 dated Nov. 20, 2018, 6 pages.

* cited by examiner

*Primary Examiner* — Robert T Butcher
(74) *Attorney, Agent, or Firm* — Lowenstein Sandler LLP

(57) ABSTRACT

The invention is related to a fiber reinforced composition with superior balance of the strength/stiffness and the strain at break. It is further related to articles comprising the fiber reinforced composition.

14 Claims, No Drawings

FIBER REINFORCED POLYPROPYLENE COMPOSITION WITH HIGH STRAIN AT BREAK

CROSS-REFERENCE TO RELATED APPLICATION(S)

This application is a national phase of International Application No. PCT/EP2016/064776, filed on Jun. 27, 2016, which claims the benefit of European Patent Application No. 15174807.6, filed on Jul. 1, 2015. The contents of these applications are hereby incorporated by reference in their entirety.

The present invention relates to a fiber reinforced composition as well as articles formed therefrom.

Polypropylene is a material used in a wide variety of technical fields, and reinforced polypropylenes have in particular gained relevance in fields previously exclusively relying on non-polymeric materials, in particular metals. One particular example of reinforced polypropylenes is glass fiber reinforced polypropylene. Such materials enable a tailoring of the properties of the composition by selecting the type of polypropylene, the amount of glass fiber and sometimes by selecting the type of coupling agent used. Accordingly, nowadays glass-fiber reinforced polypropylene is a well-established material for applications requiring high stiffness, heat deflection resistance and resistance to both impact and dynamic fracture loading (examples include automotive components with a load-bearing function in the engine compartment, support parts for polymer body panels, washing machine and dishwasher components).

However there is still a need in the art to have polypropylene (PP) grades combining a very high stiffness level typically achieved with glass fiber (GF) compounds with an increased tenacity. A key parameter in this context is the strain at break (or elongation at break, $\varepsilon_B$) which normally is at a very low level, i.e. <3.0%) for PP/GF grades. This goal is generally considered to be difficult to achieve because the coupling in PP/GF composites achieved by a chemical reaction between the GF sizing (surface coating) and the normally applied adhesion promoter is limiting the deformation of the matrix polymer. The limit in deformation becomes even stronger with increasing glass fiber content, but the coupling on the other hand is decisive for the stiffness and impact resistance (toughness) of the material.

Varieties of investigations have been done to stretch the properties of glass fiber reinforced polypropylene.

Fujiyama M. and Kimura S. describe in "Effect of Molecular Parameters on the Shrinkage of Injection-Molded Polypropylene" (J. Appl. Polym. Sci. 22 (1978) 1225-1241) compositions of PP homopolymers, random and impact copolymers with glass fibers which have been investigated in terms of shrinkage. The polymers are characterized very superficially only, and the glass fibers not at all; mechanical data are missing.

WO 98/16359 A1 describes rod-shaped PP pellets containing glass and PP fibers, the fibers having the length of the pellets. The core contains a mixture of GF with PP fibers, the fibers being a PP homopolymer or a random copolymer with ≤10 wt. % C2 or C4-C10 as comonomer, while the sheath comprises a PP homopolymer and/or a random copolymer with ≤10 wt. % C2 or C4-C10 as comonomer and/or a PP impact copolymer with ≤27 wt. % C2 or C4-C10 as comonomer.

EP 2062936 A1 describes PP glass fiber compositions with >15 wt. % glass fibers and a heterophasic PP composition comprising a matrix phase and at least two disperse elastomer components with a total comonomer content of ≥12 wt. % and a comonomer content in the elastomer phase of ≥20 wt. %. The compositions have good impact properties while sacrificing the strength/stiffness of the material.

EP 2308923 B1 describes fiber reinforced compositions comprising (a) an EP-heterophasic copolymer, (b) a PP homo- or copolymer with MFR≥500, and (c) fibers having good flowability.

WO2014033017 A1 describes fiber reinforced composition comprising (a) a polypropylene random copolymer comprising ethylene and/or $C_4$ to $C_8$ α-olefin (PP-RACO), (b) fibers (F), and (c) a polar modified polypropylene as adhesion promoter (AP) having a balanced stiffness and tenacity. However the strain at break of the material is still not satisfying.

Accordingly the object of the present invention is to provide a fiber reinforced composition with superior toughness, together with high strain at break, while maintaining the good mechanical properties, like tensile modulus and impact strength.

The finding of the present invention is that a glass fiber reinforced polypropylene composition with superior balance of the strength/stiffness and the strain at break can be obtained with fibers embedded in a special combination of a propylene polymer with moderate melt flow rate ($MFR_2$ (230° C.)) and a heterophasic propylene copolymer, wherein the heterophasic propylene copolymer is further featured by a moderate comonomer content and rather low intrinsic viscosity (IV) of the xylene cold soluble (XCS) fraction. This composition is ideally suited for use for the production of, for example, automotive articles.

Therefore from the first aspect the present invention is directed to a fiber reinforced composition comprising
   (a) 5.0 to 89.5 wt. % of a heterophasic polypropylene copolymer (HECO),
   (b) 5.0 to 89.5 wt. % of a propylene polymer (PP) having a melt flow rate $MFR_2$ (230° C.) measured according to ISO 1133 of 1-150 g/10 min,
   (c) 5.0 to 65.0 wt. % of Glass fibers (GF) and
   (d) 0.5 to 5.0 wt. % of a polar modified polypropylene as adhesion promoter (AP),
   based on the total weight of the fiber reinforced composition,
   wherein
   (i) the heterophasic polypropylene copolymer (HECO) having a xylene cold soluble (XCS) content in the range of 10.0 to lower than 25.0 wt. % based on the heterophasic polypropylene copolymer (HECO);
   (ii) the xylene cold soluble (XCS) fraction of the heterophasic polypropylene copolymer (HECO) having a comonomer content in the range of 15.0 to 35.0 wt. %, and an intrinsic viscosity (IV) of lower than 2.0 dl/g.

It is essential that the heterophasic polypropylene copolymer (HECO) in the fiber reinforced composition according to the present invention has a xylene cold soluble (XCS) content lower than 25.0 wt. %, preferably in the range of 15.0 to lower than 25.0 wt. %. Also the xylene cold soluble (XCS) fraction of the heterophasic polypropylene copolymer (HECO) having a comonomer content in the range of 15.0 to 35.0 wt. %, preferably in the range of 18.0 to 32.0 wt, and an intrinsic viscosity (IV) of lower than 2.0 dl/g, preferably lower than 1.8 dl/g.

From the second aspect the present invention is directed to an automotive article comprising a fiber reinforced composition as defined hereinbefore. Further it is directed to a foamed article comprising a fiber reinforced composition as defined hereinbefore.

From the third aspect the present invention is also directed to the use of the fiber reinforced composition defined hereinbefore for producing automotive articles, as well as the parts from washing machines and dishwashers.

In the following the polymer composition is defined in more detail.

DETAILED DESCRIPTION OF THE INVENTION

Heterophasic Polypropylene Copolymer (HECO)

It is essential that the fiber reinforced composition in the present invention comprises a heterophasic polypropylene copolymer (HECO), wherein said heterophasic polypropylene copolymer (HECO) forms from 5.0 to 89.5 wt. %, preferably from 10.0 to 85.0 wt %, more preferably from 10.0 to 70.0 wt % of the total weight of the fiber reinforced composition. Such a polymer comprises at least two components, a matrix (M) component and a dispersed phase component (i.e. an elastomeric component).

In a preferred embodiment, the overall melt flow rate $MFR_2$ (230° C.) of the heterophasic polypropylene copolymer (HECO) measured according to ISO 1133 composition is from higher than 2.0 to 50.0 g/10 min, such as from 5.0 to 40.0 g/10 min and in embodiments from 5.0 to 30.0 g/10 min.

Also it is preferred that the overall comonomer content of the heterophasic polypropylene copolymer (HECO) is in the range of 5.0 to 30.0 wt. %, preferably in the range of 5.0 to 28.0 wt. %, more preferably in the range of 5.0 to 25.0 wt. %, based on the said heterophasic polypropylene copolymer (HECO).

The heterophasic polypropylene to be employed in accordance with the present invention may thus comprise a matrix (M) phase comprising one or more propylene polymer components. In preferred embodiments, the matrix (M) phase comprises one propylene polymer component or two propylene components.

The matrix (M) phase usually comprises at least one propylene homopolymer and/or a propylene copolymer. In one embodiment the matrix (M) component is formed from a propylene copolymer with at least one comonomer. The term "comonomer" is defined herein as the types of monomers present in the polypropylene composition other than propylene. Preferred comonomers are ethylene and C4-C8 alpha-olefins, and more preferably the comonomer is ethylene. In another embodiment, the matrix (M) phase however, may also be a homopolymer, wherein the term "homopolymer" also comprises embodiments wherein minor amounts of less than 0.1 wt. % of comonomers are present, wherein the comonomers are selected among those identified above.

In a preferred embodiment the matrix (M) of the heterophasic polypropylene copolymer (HECO) in the present invention is a propylene random copolymer (M-RPP). By the term "random copolymer" is meant herein that the comonomer in said copolymer is distributed randomly, i.e. by statistical insertion of the comonomer units, within the copolymer chain. Said term "random" copolymer is generally known and used in the art.

Preferably, the matrix (M) being a propylene random copolymer (M-RPP) may further comprise at least two propylene polymer components, preferably either (i) a propylene homopolymer or a propylene random copolymer in combination with (ii) a propylene random copolymer. Most preferably the matrix (M) being a propylene random copolymer (M-RPP) component is a random propylene ethylene copolymer or mixture of random propylene ethylene copolymers.

The propylene polymer components for the matrix (M) phase are preferably combined by preparing the matrix (M) phase as in-situ reactor blend, i.e. by preparing the different components of the matrix (M) phase during subsequent polymerization steps in suitable reactor arrangements.

Preferably, the matrix (M) being a random propylene copolymer (M-RPP) of the heterophasic polypropylene copolymer (HECO) may have a comonomer content of up to 10 wt. %, typically 1 to 8 wt. %, more preferably 2 to 5 wt. %.

The matrix (M) being a random propylene copolymer (M-RPP) of the heterophasic polypropylene copolymer (HECO) may be unimodal or multimodal, i.e. the different components of the matrix (M) phase may either show similar molecular weight distributions or different molecular weight distributions (and accordingly also melt flow rate $MFR_2$ (230° C.) values).

The matrix (M) being a random propylene copolymer (M-RPP) of the heterophasic polypropylene copolymer (HECO) in accordance with the present invention preferably shows an melt flow rate $MFR_2$ (230° C.) measured according to ISO 1133 of from 0.5 to 100 g/10 min, preferably from 2 to 50 g/10 min. In an especially preferred embodiments the said random propylene copolymer (M-RPP) shows an melt flow rate $MFR_2$ (230° C.) of below 30 g/10 min, such as from 2 to 30 g/10 min, preferably from 5 to 20 g/10 min.

The matrix (M) phase may preferably form up to 90 wt. % of the heterophasic polypropylene copolymer (HECO).

The dispersed phase of the heterophasic polypropylene copolymer (HECO) preferably comprises at least one, e.g. two suitable elastomeric propylene copolymer (E), more preferably one suitable elastomeric propylene copolymer (E). This dispersed phase (rubber phase) in the heterophasic polypropylene copolymer (HECO) according to the present invention form up to lower than 25 wt. % of the total weight of the heterophasic polypropylene copolymer (H ECO). Suitable ranges are 10 to lower than 25 wt. % and in embodiments also 10 to 23 wt. %.

The elastomeric propylene copolymer (E) as dispersed phase in the heterophasic polypropylene copolymer (HECO) is preferably propylene copolymer with olefin comonomers, preferably ethylene. The preferred comonomer content in elastomeric propylene copolymer (E) is in the range of from 15 to 35 wt. %, more preferably 20 to 32 wt. %.

Examples of olefin comonomers, in addition to the preferred ethylene, are C4-C8 alpha-olefins. According to a preferred embodiment of the present invention, the elastomeric propylene copolymer (E) is an ethylene propylene rubber (EPR). EPR materials are more cost-effective than rubbers with higher alpha-olefins and they can be synthesized in a final step of a multi-step process, where the first steps synthesize the matrix (M) polymer.

In one embodiment, the dispersed phase may comprise at least two elastomeric components, e.g. as described in WO2009/065589.

Most preferably the elastomeric propylene copolymer (E) is a random propylene ethylene copolymer.

The heterophasic polypropylene copolymer (HECO) of the invention may be produced in a multistage process as is known in the art. That process may involve the combination of at least one slurry and at least one gas phase reactor connected directly together in series.

The slurry phase polymerization may be carried out at temperatures of lower than 75° C., preferably 60-65° C. and pressures varying between 30-90 bar, preferably 30-70 bar. The polymerization is preferably carried out in such conditions that 20-90 wt. %, preferably 40-80 wt. % from the polymer is polymerized in the slurry reactor or reactors. The residence time can be between 15 and 120 min.

The gas phase polymerization step is carried out by transferring the reaction mixture from the slurry phase directly to the gas phase without removing unreacted monomers. The pressure is preferably higher than 10 bars. The reaction temperature used will generally be in the range 60 to 115° C., preferably 70 to 110° C. The reactor pressure will be higher than 5 bars, and preferably be in the range 10 to 25 bar, and the residence time will generally be 0.1 to 5 hours. Since unreacted monomers from the slurry phase are transferred into the gas phase it is important to establish how much unreacted monomer has been transferred to allow ready determination of how much further monomer to add to the gas phase. Such measurements can be achieved by simple gas chromatography allowing maintenance of appropriate comonomer concentrations.

The liquid medium from the first stage reactor can function as a cooling medium of the fluid bed in the gas phase reactor, when evaporating therein.

Polymerization may be achieved using any standard olefin polymerization catalyst and these are well known to the person skilled in the art. Preferred catalyst systems comprise an ordinary stereospecific Ziegler Natta catalyst, metallocene catalysts and other organometallic or coordination catalysts. A particularly preferred catalyst system is a high yield Ziegler-Natta catalyst having a catalyst component, a cocatalyst component, optionally an external donor.

Heterophasic polypropylene copolymers (HECO) are well known commercial products and can be purchased from suppliers. Processes for making them are well known.

Propylene Polymer (PP)

It is essential that the fiber reinforced composition in the present invention comprises another propylene polymer (PP) which has a melt flow rate $MFR_2$ (230° C.) in the range of 1-150 g/10 min. Preferably, the melt flow rate $MFR_2$ (230° C.) of PP is at least 5 g/10 min, more preferably at least 10 g/10 min, yet more preferably at least 12 g/10 min. The upper limit of the melt flow rate $MFR_2$ (230° C.) is preferably not more than 150 g/10 min, more preferably not more than 120 g/10 min. It is to be understood that each upper limit may be combined with each lower limit. Accordingly it is especially preferred that the propylene polymer (PP) has a melt flow rate $MFR_2$ (230° C.) in the range of 1 to 150 g/10 min, more preferably in the range of 5 to 150 g/10 min, still more preferably in the range of 10 to 120 g/10 min.

The propylene polymer (PP) may be selected from a propylene homopolymer (H-PP) and a random polypropylene copolymer (R-PP) comprising at least one comonomer. The term "comonomer" is defined herein as the types of monomers present in the polypropylene composition other than propylene. Preferred comonomers are ethylene and C4-C8 alpha-olefins, and more preferably the comonomer is ethylene. Note that the term "homopolymer" also comprises embodiments wherein minor amounts of less than 0.1 wt. % of comonomers are present, wherein the comonomers are selected among those identified above.

It is also possible that more than one sort of propylene polymer (PP) is used, however it is especially preferred that just one sort of propylene polymer (PP) is used in the present fiber reinforced composition.

In a further preferred embodiment of the present invention, the propylene polymer (PP) being the random polypropylene copolymer (R-PP) comprises 1.0 to 8.0 wt.-% of ethylene and/or $C_4$ to $C_8$ α-olefin based on the random polypropylene copolymer (R-PP). The upper limit of the ethylene and/or $C_4$ to $C_8$ α-olefin content is 8.0 wt.-%, 7.0 wt.-%, 6.0 wt.-%, 5.0 wt.-%, or 4.6 wt.-%. The lower limit of the ethylene and/or $C_4$ to $C_8$ α-olefin content is 0.5 wt.-%, 1.0 wt.-%, 1.2 wt.-%, 1.3 wt.-%, or 1.4 wt.-%. It is to be understood that each upper limit may be combined with each lower limit, resulting e.g. in a range of 0.5 to 8.0 wt.-%, more preferably in a range of 1.0 wt.-% to 6.0 wt.-%, still more preferably in a range of 1.0 to 5.0 wt.-%, like in a range of 1.5 to 4.6 wt.-%, based on the random polypropylene copolymer (R-PP).

In a further preferred embodiment of the present invention, the propylene polymer (PP) being the random polypropylene copolymer (R-PP) has a monomodal, bimodal or multimodal molecular weight or comonomer distribution.

In one embodiment, the random polypropylene copolymer (R-PP) has a monomodal or bimodal molecular weight or comonomer distribution.

In one embodiment, the random polypropylene copolymer (R-PP) has a monomodal molecular weight or comonomer distribution.

In one embodiment, the random polypropylene copolymer (R-PP) has a bimodal molecular weight or comonomer distribution.

In one embodiment, the random polypropylene copolymer (R-PP) has a multimodal molecular weight or comonomer distribution.

Thus expression "multimodal" or "bimodal" used herein refers to the modality of the polymer, i.e.

the form of its molecular weight distribution curve, which is the graph of the molecular weight fraction as a function of its molecular weight, and/or the form of its comonomer content distribution curve, which is the graph of the comonomer content as a function of the molecular weight of the polymer fractions.

As will be explained below, the random polypropylene copolymer (R-PP) can, if it is of multimodal or bimodal character, be produced by blending different polymer types, i.e. of different molecular weight and/or comonomer content. However, it is preferred that the random polypropylene copolymer (R-PP) is produced in a sequential multi-step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

Accordingly in case of a bimodal system, in particular in view of the comonomer content, the split of the two fractions is roughly 50:50. Thus in one embodiment the random polypropylene copolymer (R-PP) comprises two fractions which differ in their comonomer content, like ethylene content, wherein the first fraction is present from 40 to 60 wt.-% and the second fraction from 60 to 40 wt.-%.

The random polypropylene copolymer (R-PP) may be produced in a polymerization stage effected in one or more polymerization reactors. Desirably the random polypropylene copolymer (R-PP) comprising two or more different propylene copolymers may be produced by carrying out polymerization in two or more different polymerization reactors (e.g. bulk and/or gas phase reactors; as bulk reactors, loop reactors are preferred) to generate polymers of the different desired molecular weight distributions or comonomer make ups in the different polymerization reactors.

The random polypropylene copolymer (R-PP) comprises, preferably consists of, ethylene and/or at least one $C_4$ to $C_8$ α-olefin, preferably at least one α-olefin selected from the group consisting of ethylene, 1-butene, 1-pentene, 1-hexene and 1-octene, more preferably ethylene and/or 1-butene, yet more preferably ethylene.

Preferably the random polypropylene copolymer (R-PP) has a melting temperature $T_m$ measured according to ISO 11357-3 of at least 135° C., more preferably of at least 140° C., yet more preferably in the range of 135 to 160° C., still more preferably in the range of 140 to 156° C.

Further it is appreciated that the units derived from ethylene and $C_4$ to $C_8$ α-olefins within the random polypropylene copolymer (R-PP) are randomly distributed. The randomness indicates the amount of isolated comonomer units, i.e. those which have no other comonomer units in the neighbourhood, compared to the total amount of comonomers in the polymer chain. In a preferred embodiment, the randomness of the random polypropylene copolymer (R-PP) is at least 30%, more preferably at least 50%, even more preferably at least 60%, and still more preferably at least 65%.

In further embodiment of the present invention, the random polypropylene copolymer (R-PP) has a xylene cold soluble content (XCS) of not more than 20 wt.-%, preferably not more than 15 wt.-%, still more preferably not more than 12 wt.-%, such as 1.0 to 20 wt.-%, 1.2 to 15 wt.-%, 1.4 to 15 wt.-%, 1.5 to 12 wt.-%.

The polymerization system for the preparation of the propylene polymer (PP) can comprise one or more conventional stirred slurry reactors and/or one or more gas phase reactors. Preferably the reactors used are selected from the group of loop and gas phase reactors and, in particular, the process employs at least one loop reactor. It is also possible to use several reactors of each type, e.g. one loop and two or three gas phase reactors, or two loops and one or two gas phase reactors, in series.

Preferably the process comprises also a prepolymerization with the chosen catalyst system, as described in detail below, comprising the Ziegler-Natta procatalyst, the external donor and the cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 50° C., preferably from 10 to 45° C., and more preferably from 15 to 40° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

A slurry reactor designates any reactor, such as a continuous or simple batch stirred tank reactor or loop reactor, operating in bulk or slurry and in which the polymer forms in particulate form. "Bulk" means a polymerization in reaction medium that comprises at least 60 wt.-% monomer. According to a preferred embodiment the slurry reactor comprises a bulk loop reactor.

"Gas phase reactor" means any mechanically mixed or fluid bed reactor. Preferably the gas phase reactor comprises a mechanically agitated fluid bed reactor with gas velocities of at least 0.2 m/sec.

A preferred multistage process is a slurry-gas phase process, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315. They are incorporated herein by reference.

A further suitable slurry-gas phase process is the Spheripol® process of Basell.

Glass Fibers (GF)

Essential component of the present fiber reinforced composition are the glass fibers (GF). The glass fibers (GF) used in the fiber reinforced composition preferably have an average length of from 1 to 20 mm and preferably have an average diameter of from 8 to 20 μm. Preferably, the glass fibers (GF) have an aspect ratio of 125 to 1500. The aspect ratio is the relation between average length and average diameter of the fibers.

Preferably the glass fibers are cut glass fibers, also known as short fibers or chopped strands.

The chopped or short glass fibers (GF) used in the fiber reinforced composition preferably have an average length of from 1 to 10 mm, more preferably from 1 to 7 mm, for example 3 to 5 mm. The cut or short glass fibers used in the fiber reinforced composition preferably have an average diameter of from 8 to 20 μm, more preferably from 9 to 16 μm, for example 9 to 15 μm.

Preferably, the glass fibers (GF) have an aspect ratio of 125 to 650, preferably of 150 to 450, more preferably 200 to 400, still more preferably 250 to 350. The aspect ratio is the relation between average length and average diameter of the fibers.

Adhesion Promoter (AP)

The polar modified polypropylene as adhesion promoter (AP) is applied in order to achieve a chemical reaction between the glass fibers and the adhesion promoter. As a result, the glass fibers can be easier and more uniformly dispersed in the polymer matrix.

The adhesion promoter (AP) preferably comprises a modified (functionalized) polymer and optionally a low molecular weight compound having reactive polar groups.

Modified α-olefin polymers, in particular propylene homopolymers and copolymers, like copolymers of ethylene and propylene with each other or with other α-olefins, are most preferred, as they are highly compatible with the polymers of the fiber reinforced composition. Modified polyethylene can be used as well.

In terms of structure, the modified polymers are preferably selected from graft or block copolymers.

In this context, preference is given to modified polymers containing groups deriving from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of the said polar compounds are unsaturated cyclic anhydrides and their aliphatic diesters, and the diacid derivatives. In particular, one can use maleic anhydride and compounds selected from $C_1$ to $C_{10}$ linear and branched dialkyl maleates, $C_1$ to $C_{10}$ linear and branched dialkyl fumarates, itaconic anhydride, $C_1$ to $C_{10}$ linear and branched itaconic acid dialkyl esters, maleic acid, fumaric acid, itaconic acid and mixtures thereof.

Particular preference is given to using a propylene polymer grafted with maleic anhydride as the modified polymer, i.e. as the adhesion promoter (AP).

The modified polymer, i.e. the adhesion promoter (AP), can be produced in a simple manner by reactive extrusion of the polymer, for example with maleic anhydride in the presence of free radical generators (like organic peroxides), as disclosed for instance in EP 0 572 028.

Preferred amounts of groups deriving from polar compounds in the modified polymer, i.e. the adhesion promoter (AP), are from 0.5 to 3.0 wt.-%, more preferably from 0.5 to 4.0 wt.-%, still more preferably from 0.5 to 3.0 wt.-%.

Preferred values of the melt flow rate $MFR_2$ (230° C.) for the modified polymer, i.e. for the adhesion promoter (AP), are from 1.0 to 500 g/10 min.

Composition

The instant composition may additionally contain typical other additives useful for instance in the automobile sector, like carbon black, other pigments, antioxidants, UV stabilizers, nucleating agents, antistatic agents and slip agents, in amounts usual in the art.

In a further preferred embodiment of the present invention, the weight ratio between the said heterophasic polypropylene copolymer (HECO) and the said propylene polymer (PP) is in the range of 1:5 to 2:1, preferably in the range of 1:5 to 1:1, more preferably in the range of 1:3 to 1:1.

Regarding to the mechanical properties, in a further embodiment the overall tensile strength of the fiber reinforced composite measured according to ISO 527-2, is at least 80.0 MPa. In an even preferred embodiment, the tensile strength of the fiber reinforced composite is at least 85.0 MPa, in a further embodiment, the tensile strength of the fiber reinforced composite is at least 90.0 MPa.

In another preferred embodiment, the overall strain at break of the fiber fiber reinforced composition measured according to ISO 527-2 is not lower than 4.0%, preferably not lower than 4.2%, most preferably not lower than 4.4%.

In a further preferred embodiment, the Notched impact strength (23° C.) of the fiber reinforced composition measured according to ISO 179 1eA is not lower than 12.0 kJ/m², preferably not lower than 12.5 kJ/m², more preferably not lower than 13.0 kJ/m².

It is preferred that the fiber reinforced composition has good combination of the above described mechanical properties, namely the tensile strength, strain at break and/or Notched impact strength. For example, in a preferred embodiment, the fiber reinforced composition has a tensile strength of at least 80.0 MPa, and a strain at break of not lower than 4.0%, and/or a notched impact strength (23° C.) of not lower than 12.0 kJ/m².

For mixing the individual components of the present fiber reinforced composition, a conventional compounding or blending apparatus, e.g. a Banbury mixer, a 2-roll rubber mill, Buss-co-kneader or a twin screw extruder may be used. Preferably, mixing is accomplished in a co-rotating twin screw extruder. The polymer materials recovered from the extruder are usually in the form of pellets. These pellets are then preferably further processed, e.g. by injection molding to generate articles and products of the inventive fiber reinforced composition.

The fiber reinforced composition according to the invention may be pelletized and compounded using any of the variety of compounding and blending methods well known and commonly used in the resin compounding art.

The present invention also relates to automotive articles comprising the fiber reinforced composition as defined above.

The present fiber reinforced composition can be used for the production of molded articles, preferably injection molded articles as well as foamed articles. Even more preferred is the use for the production of parts of washing machines or dishwashers as well as automotive articles, especially of car interiors and exteriors, like instrumental carriers, shrouds, structural carriers, bumpers, side trims, step assists, body panels, spoilers, dashboards, interior trims and the like.

According to a preferred embodiment, the article is a foamed article comprising the fiber reinforced composition described above.

Examples of such foamed articles for automotive applications are instrumental carriers, shrouds, or structural carriers.

Appropriate preparation methods of foamed articles, either by chemical or physical foaming, are commonly known to the skilled person.

The present invention will now be described in further detail by the examples provided below.

EXAMPLES

1. Definitions/Measuring Methods

The following definitions of terms and determination methods apply for the above general description of the invention as well as to the below examples unless otherwise defined.

Density is measured according to ISO 1183-187. Sample preparation is done by compression molding in accordance with ISO 1872-2:2007

Melting temperature Tm is measured according to ISO 11357-3

$MFR_2$ (230° C.) is measured according to ISO 1133 (230° C., 2.16 kg load).

Quantification of Comonomer Content by FTIR Spectroscopy

The comonomer content is determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of between 100-500 µm and spectra recorded in transmission mode.

Specifically, the ethylene content of a polypropylene-co-ethylene copolymer is determined using the baseline corrected peak area of the quantitative bands found at 720-722 and 730-733 cm$^{-1}$. Quantitative results are obtained based upon reference to the film thickness.

Tensile Modulus; Tensile stain at break; are measured according to ISO 527-2 (cross head speed=50 mm/min for measurement of strain at break, and 1 mm/min for Tensile Modulus; 23° C.) using injection molded specimens as described in EN ISO 1873-2 (dog bone shape, 4 mm thickness).

Charpy impact test: The Charpy (notched) impact strength (Charpy NIS/IS) is measured according to ISO 179 1eA at 23° C., using injection molded bar test specimens of 80×10×4 mm prepared in accordance with ISO 294-1:1996.

The xylene solubles (XCS, wt.-%): Content of xylene cold solubles (XCS) is determined at 25° C. according ISO 16152; first edition; 2005 Jul. 1.

Average Fiber Diameter:
Determined according to ISO 1888:2006(E), Method B, microscope magnification of 1000

2. Examples

The following inventive examples IE1 to IE3 and comparative examples CE1 to CE4 were prepared by compounding on a co-rotating twin-screw extruder with a screw configuration typical for glass fiber mixing using a temperature range between 200 and 240° C.

What is claimed is:
1. A fiber reinforced composition comprising
   (a) 5.0 to 89.5 wt. % of a heterophasic polypropylene copolymer (HECO),
   (b) 5.0 to 89.5 wt. % of a propylene polymer (PP) having a melt flow rate MFR2 at 230° C. measured according to ISO 1133 of 1-150 g/10 min,
   (c) 5.0 to 65.0 wt. % of Glass fibers (GF) and
   (d) 0.5 to 5.0 wt. % of a polar modified polypropylene as adhesion promoter (AP),
   based on the total weight of the fiber reinforced composition, wherein
   (i) the heterophasic polypropylene copolymer (HECO) having a xylene cold soluble (XCS) content in the range of 10.0 to lower than 25.0 wt. % based on the heterophasic polypropylene copolymer (HECO);
   (ii) the xylene cold soluble (XCS) fraction of the heterophasic polypropylene copolymer (HECO) having a comonomer content in the range of 15.0 to 35.0 wt. %, and an intrinsic viscosity (IV) of lower than 2.0 dl/g,
   wherein the weight ratio between the heterophasic polypropylene copolymer (HECO) and the propylene polymer (PP) is in the range of 1:5 to 1:1.
2. The fiber reinforced composition according to claim 1, wherein said heterophasic polypropylene copolymer (HECO) has a melt flow rate MFR2 at 230° C. measured according to ISO 1133 in the range of higher than 2.0 to 50.0 g/10 min.

TABLE 1

Overview of composition and mechanics for inventive and comparative examples

|  |  | CE 1* | CE 2* | IE 1* | IE 2* | IE 3* |
|---|---|---|---|---|---|---|
| HECO1 | [wt.-%] |  |  | 10.0 | 20.0 | 20.0 |
| PP1 | [wt.-%] | 62.5 |  |  |  |  |
| PP2 | [wt.-%] |  | 62.5 | 50 | 40 | 35 |
| GF | [wt.-%] | 32.0 | 32.0 | 35.0 | 35.0 | 40 |
| AP | [wt.-%] | 1.5 | 1.5 | 1.5 | 1.5 | 1.5 |
| MFR$_2$ | [g/10 min] | 16.6 | 6.2 | 4.94 | 4.34 | 3.24 |
| TM | [MPa] | 6362 | 6158 | 6988 | 6924 | 7825 |
| TS | [MPa] | 95 | 90 | 95 | 92 | 97 |
| TSB | [%] | 3.8 | 4.2 | 4.6 | 5.0 | 4.6 |
| NIS | [kJ/m$^2$] | 9.3 | 9.4 | 13.2 | 14.5 | 14.6 |

*remaining part up 100 wt.-% are typical additives like antioxidants.
TM      tensile modulus
TS      tensile strength
TSB     tensile strain at break
NIS     Charpy impact (notched)
HECO1   is a commercial heterophasic polypropylene copolymer (HECO) Borsoft SD233CF of Borealis AG prepared in-situ in a sequential polymerization process with an MFR$_2$ (230° C.) of 7 g/10 min, an XCS content of 23 wt % and a total ethylene content of 8 wt %.
PP1     is the commercial polypropylene random copolymer (R-PP) "RJ470MO" of Borealis AG with an MFR$_2$ of 70 g/10 min, a melting temperature of 150° C., an ethylene content of 2.8 wt.-%, a XCS content of 5 wt.-%, a density of 905 kg/m$^3$, and a tensile modulus of 1,200 MPa;
PP2     is the commercial polypropylene random copolymer (R-PP) "RF366MO" of Borealis AG with an MFR$_2$ of 20 g/10 min, a melting temperature of 151° C., an ethylene content of 3.3 wt.-%, a XCS content of 6.0 wt %, a density of 905 kg/m$^3$, and a tensile modulus of 1,200 MPa;
GF      are the commercial glass fibers "Thermo Flow ® Chopped Strand 636 for PP" of Johns Manville, which are E-glass fibers coated with a silane based sizing, a length of 4 mm, and an average diameter of 13 µm;
AP      is the commercial maleic anhydride functionalized polypropylene "Scona TPPP 2112FA" of Kometra GmbH, Germany with a density of 0.9 g/cm$^3$, having an MFR$_2$ of 5 g/10 min and an MAH content of 1.2 mol.-%.

3. The fiber reinforced composition according to claim 1, wherein said heterophasic polypropylene copolymer (HECO) has a comonomer content in the range of 5.0 to 30.0 wt. % based on the said heterophasic polypropylene copolymer (HECO).

4. The fiber reinforced composition according to claim 1, wherein said heterophasic polypropylene copolymer (HECO) comprises a matrix (M) being a propylene random copolymer (M-RPP) and an elastomeric propylene copolymer (E) dispersed in said matrix (M), wherein
   a) said propylene random copolymer (M-RPP) has a melt flow rate MFR2 at 230° C. of below 30 g/10 min;
   or
   b) the comonomer content of the said propylene random copolymer (M-RPP) is in the range of 1 to 8 wt. %.

5. The fiber reinforced composition according to claim 1, wherein said propylene polymer (PP) is selected from the group consisting of a propylene homopolymer (H-PP) and a random polypropylene copolymer (R-PP) with a comonomer content in the range of 1.0 to 5.0 wt. % based on the random polypropylene copolymer (R-PP).

6. The fiber reinforced composition according to claim 1, wherein said propylene polymer (PP) has a xylene cold soluble (XCS) content of not more than 20 wt. % based on the propylene polymer (PP).

7. The fiber reinforced composition according to claim 1, wherein the tensile strain at break of the fiber reinforced composition measured according to ISO 527-2 is not lower than 4.0%.

8. The fiber reinforced composition according to claim 1, wherein the tensile strength of the fiber reinforced composition measured according to ISO 527-2 is not lower than 80.0 MPa.

9. The fiber reinforced composition according to claim 1, wherein the Notched impact strength at 23° C. of the fiber reinforced composition measured according to ISO 179 2C is not lower than 12.0 kJ/m2.

10. An automotive article comprising the fiber reinforced composition according to claim 1.

11. A foamed article, comprising the fiber reinforced composition according to claim 1.

12. A method comprising producing automotive articles with a fiber reinforced composition, the fiber reinforced composition comprising
   (a) 5.0 to 89.5 wt. % of a heterophasic polypropylene copolymer (HECO),
   (b) 5.0 to 89.5 wt. % of a propylene polymer (PP) having a melt flow rate MFR2 at 230° C. measured according to ISO 1133 of 1-150 g/10 min,
   (c) 5.0 to 65.0 wt. % of Glass fibers (GF) and
   (d) 0.5 to 5.0 wt. % of a polar modified polypropylene as adhesion promoter (AP),
   based on the total weight of the fiber reinforced composition, wherein
   (i) the heterophasic polypropylene copolymer (HECO) having a xylene cold soluble (XCS) content in the range of 10.0 to lower than 25.0 wt. % based on the heterophasic polypropylene copolymer (HECO);
   (ii) the xylene cold soluble (XCS) fraction of the heterophasic polypropylene copolymer (HECO) having a comonomer content in the range of 15.0 to 35.0 wt. %, and an intrinsic viscosity (IV) of lower than 2.0 dl/g,
   wherein the weight ratio between the heterophasic polypropylene copolymer (HECO) and the propylene polymer (PP) is in the range of 1:5 to 1:1, the automotive article is a foamed article and the method comprises the step of chemical or physical foaming.

13. A method comprising producing parts of washing machines or dishwashers with a fiber reinforced composition, the fiber reinforced composition comprising
   (a) 5.0 to 89.5 wt. % of a heterophasic polypropylene copolymer (HECO),
   (b) 5.0 to 89.5 wt. % of a propylene polymer (PP) having a melt flow rate MFR2 at 230° C. measured according to ISO 1133 of 1-150 g/10 min,
   (c) 5.0 to 65.0 wt. % of Glass fibers (GF) and
   (d) 0.5 to 5.0 wt. % of a polar modified polypropylene as adhesion promoter (AP),
   based on the total weight of the fiber reinforced composition, wherein
   (i) the heterophasic polypropylene copolymer (HECO) having a xylene cold soluble (XCS) content in the range of 10.0 to lower than 25.0 wt. % based on the heterophasic polypropylene copolymer (HECO);
   (ii) the xylene cold soluble (XCS) fraction of the heterophasic polypropylene copolymer (HECO) having a comonomer content in the range of 15.0 to 35.0 wt. %, and an intrinsic viscosity (IV) of lower than 2.0 dl/g,
   wherein the weight ratio between the heterophasic polypropylene copolymer (HECO) and the propylene polymer (PP) is in the range of 1:5 to 1:1, the automotive article is a foamed article and the method comprises the step of chemical or physical foaming.

14. The fiber reinforced composition according to claim 1, wherein said heterophasic polypropylene copolymer (HECO) comprises a matrix (M) being a propylene random copolymer (M-RPP) and an elastomeric propylene copolymer (E) dispersed in said matrix (M), wherein
   a) said propylene random copolymer (M-RPP) has a melt flow rate MFR2 at 230° C. of below 30 g/10 min;
   and
   b) the comonomer content of the said propylene random copolymer (M-RPP) is in the range of 1 to 8 wt. %.

* * * * *